United States Patent [19]
Wu

[11] Patent Number: 6,059,300
[45] Date of Patent: May 9, 2000

[54] AUXILIARY WHEEL HOLDER FOR GOLF CARTS

[76] Inventor: David Wu, No. 35-1, Jih Hsin Street, Tu Cheng Hsiang, Taipei Hsien, Taiwan

[21] Appl. No.: 09/124,506

[22] Filed: Jul. 29, 1998

[51] Int. Cl.⁷ ................................................. B62B 1/12
[52] U.S. Cl. .................................. 280/47.2; 280/DIG. 6; 280/47.26; 248/229.11; 248/229.12; 248/231.41; 248/231.31; 301/111
[58] Field of Search ............................ 280/47.2, DIG. 6, 280/47.26, 767; 248/229.1, 229.12, 229.14, 228.3, 228.5, 231.41, 231.21, 316.2, 316.4, 70, 292.12, 298.1; 403/DIG. 9, 3, 4, 373; 301/111, 114

[56] References Cited

U.S. PATENT DOCUMENTS

| | | | |
|---|---|---|---|
| 2,708,143 | 5/1955 | Kroyer et al. ........................ | 301/111 |
| 3,561,555 | 2/1971 | Carmichael ................. | 280/DIG. 6 X |
| 3,746,365 | 7/1973 | Kirschbaum ........................... | 280/767 |
| 3,815,699 | 6/1974 | Ganskopp et al. ....................... | 180/11 |
| 3,853,333 | 12/1974 | Sancho et al. ......................... | 280/767 |
| 4,266,796 | 5/1981 | Riggs et al. ........................... | 280/767 |
| 4,274,656 | 6/1981 | Warren ............................... | 280/767 X |
| 4,289,324 | 9/1981 | Nemeth ................................. | 280/38 |
| 4,538,696 | 9/1985 | Carter ................................ | 180/19.3 |
| 5,526,894 | 6/1996 | Wang ................................. | 180/65.1 |
| 5,839,528 | 11/1998 | Lee .................................. | 280/DIG. 6 |
| 5,865,385 | 11/1997 | Sanuga .............................. | 180/65.1 |

FOREIGN PATENT DOCUMENTS

672133   12/1929   France ................................ 280/767

*Primary Examiner*—Lanna Mai
*Assistant Examiner*—Ruth Ilan
*Attorney, Agent, or Firm*—Dougherty & Troxell

[57] ABSTRACT

An auxiliary wheel holder includes a base frame secured to the main rod member of a golf cart at the bottom to hold a wheel axle and a pair of auxiliary wheels at two opposite ends of the wheel axle, enabling the golf cart to be moved on the ground when the golf cart is extended out, a locating plate fastened to two upright screw rods of the base frame by lock nuts and closely attached to the main rod member of the golf cart at the top to secure the base frame to the main rod member of the golf cart, and two beveled packing blocks respectively mounted on the upright screw rods of the base frame and engaged between the base frame and the bottom side wall of the main rod member of the golf cart to fix base frame in position.

2 Claims, 8 Drawing Sheets

AUXILIARY WHEEL HOLDER FOR GOLF CARTS

BACKGROUND AND SUMMARY OF THE INVENTION

The present invention relates to an auxiliary wheel holder for golf carts, and more particularly to such an auxiliary wheel holder that can be quickly installed in the main rod member of any of a variety of golf carts to hold a pair of auxiliary wheels for permitting the golf cart to be conveniently stably moved on the ground when extended out.

When a conventional golf cart is extended out, it is supported on the ground by the wheels and the bottom bag cradle. Therefore, when the golf cart is extended out, it can not be directly moved on the ground. In order to eliminate this drawback, there is provided a golf cart with auxiliary wheel means that can be directly roved on the ground when extended out. However, the wheel holder of the auxiliary wheel means is specifically designed for a particular model of golf cart, it can not be installed in other golf carts from different suppliers.

It is one object of the present invention to provide an auxiliary wheel holder which can be conveniently installed in a golf cart to hold a pair of auxiliary wheels, enabling the golf cart to be directly moved on the ground when extended out. It is another object of the present invention to provide an auxiliary wheel holder which fits any of a variety of golf carts. It is still another object of the present invention to provide an auxiliary wheel holder that can be individually sold in stores, and conveniently installed in any of a variety of golf carts by the consumer without a special training. According to one aspect of the present invention, the auxiliary wheel holder comprises a base frame secured to the main rod member of a golf cart at the bottom to hold a wheel axle and a pair of auxiliary wheels at two opposite ends of the wheel axle, enabling the golf cart to be moved on the ground when the golf cart is extended out, a locating plate fastened to two upright screw rods of the base frame by lock nuts and closely attached to the main rod member of the golf cart at the top to secure the base frame to the main rod member of the golf cart, and two beveled packing blocks respectively mounted on the upright screw rods of the base frame and engaged between the base frame and the bottom side wall of the main rod member of the golf cart to fix the base frame in position. According to another aspect of the present invention, the packing blocks each have a plurality of transverse teeth at the bottom meshed with respective transverse teeth at the top of the base frame.

DETAILED DESCRIPTION OF THE PREFERRED EMBODIMENT

Referring to FIGS. 2, 3, 7, and 8, an auxiliary wheel holder in accordance with the present invention is generally comprised of a base frame 1 coupled to the main rod member 2 of a golf cart 4 at the bottom side to hold a wheel axle 15 and a pair of auxiliary wheels 3 at the ends of the wheel axle 15, a locating plate 6 attached to the main rod member 2 of the golf cart 4 at the top side to hold the base frame 1 in place, and two packing blocks 5 retained between the base frame 1 and the main rod member 2 of the golf cart 4.

Figure 1:
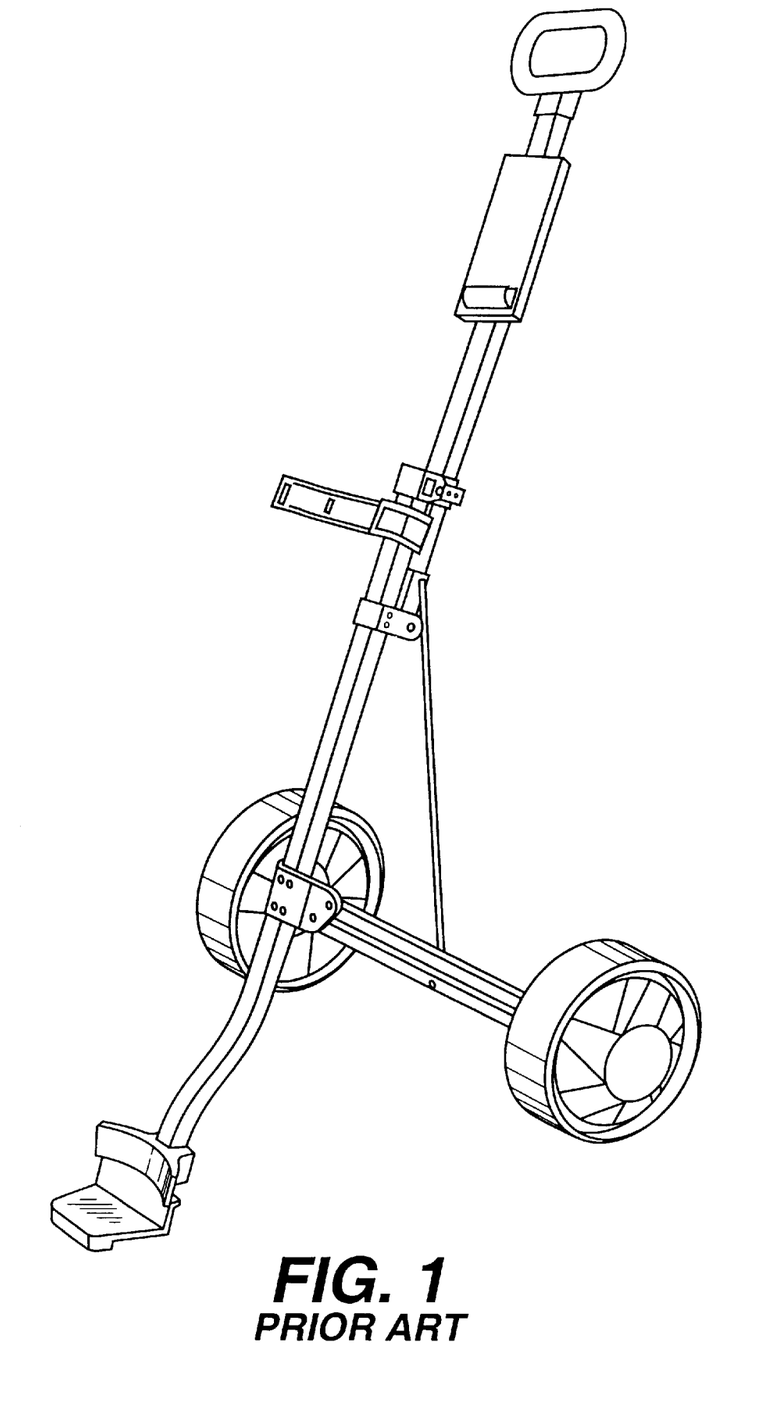
FIG. 1 shows a conventional golf cart set in the extended condition and supported on the ground.
Figure 2:
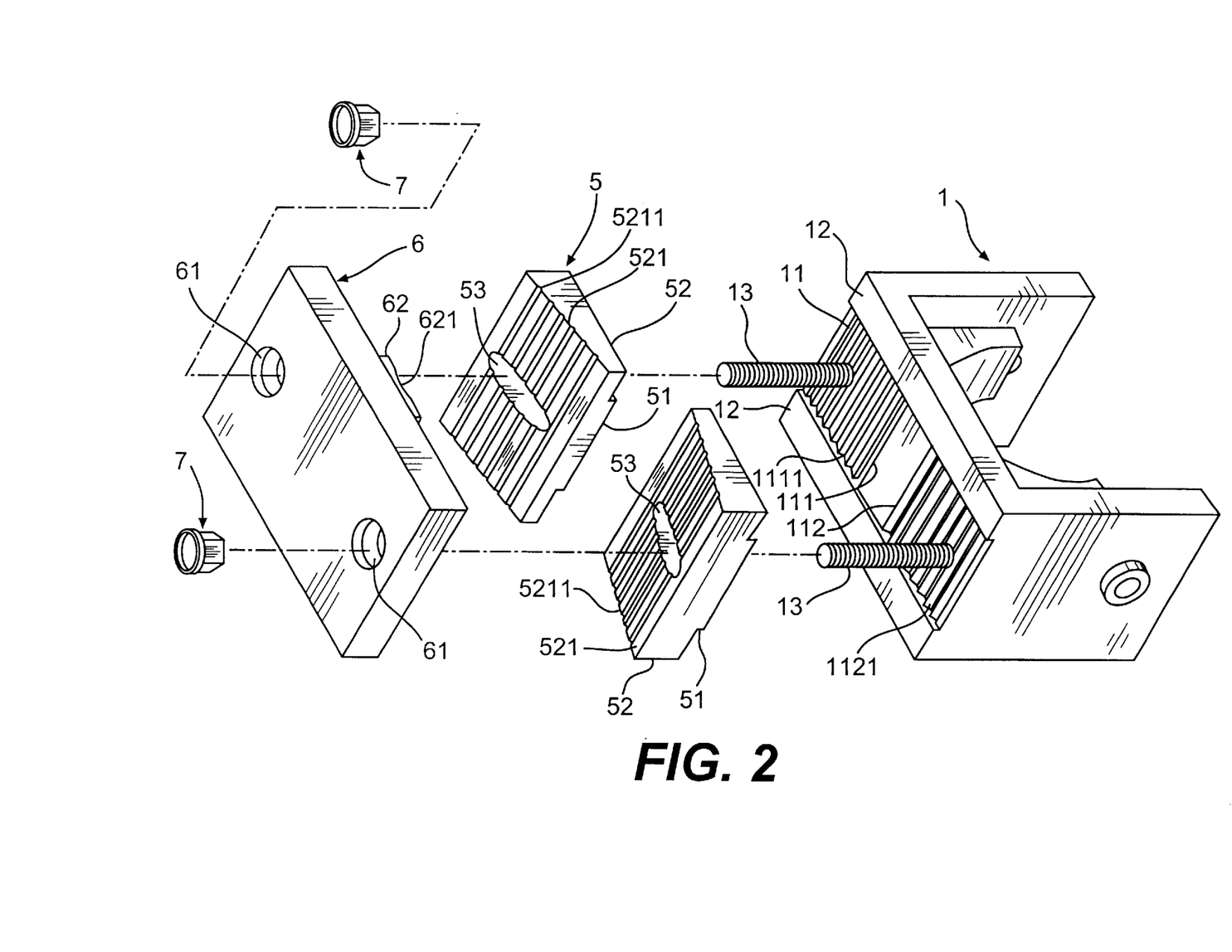
FIG. 2 is an exploded view of an auxiliary wheel holder according to the present invention.
Figure 3:
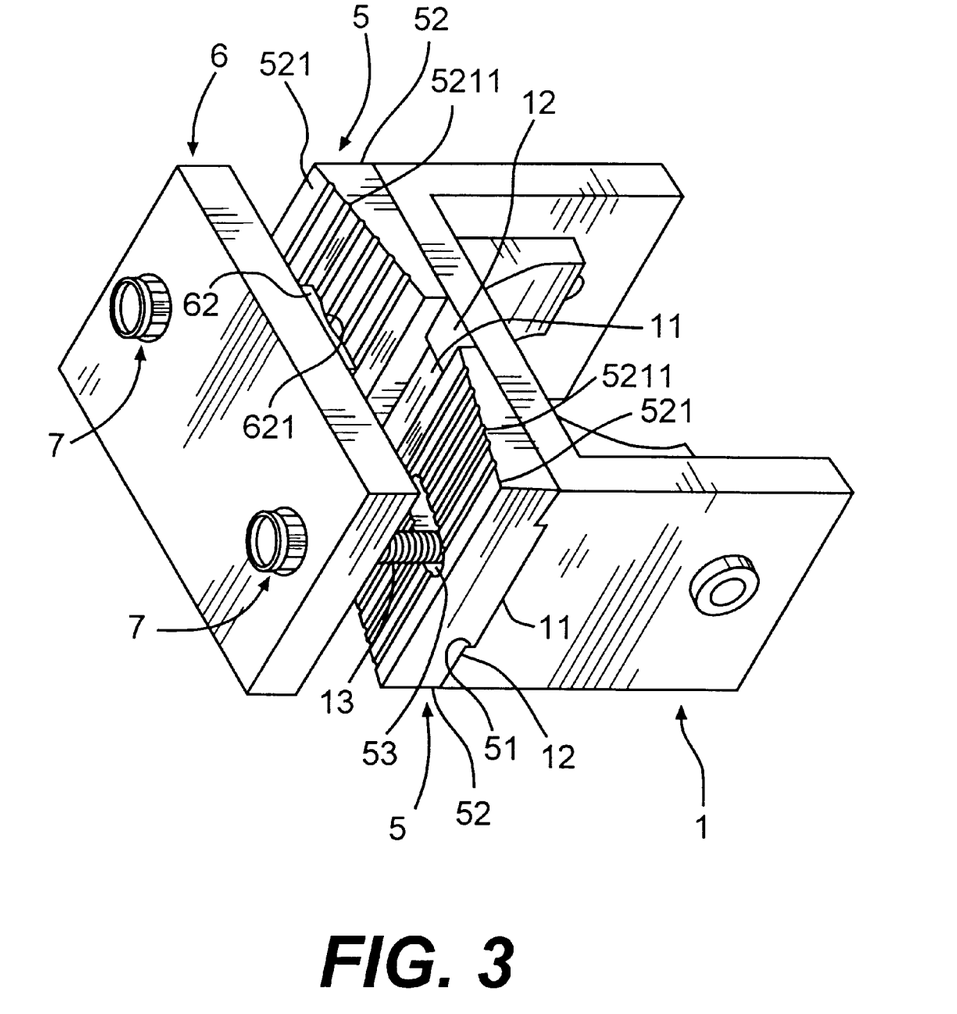
FIG. 3 is a perspective assembly view of the auxiliary wheel holder shown in FIG. 2.
Figure 4:
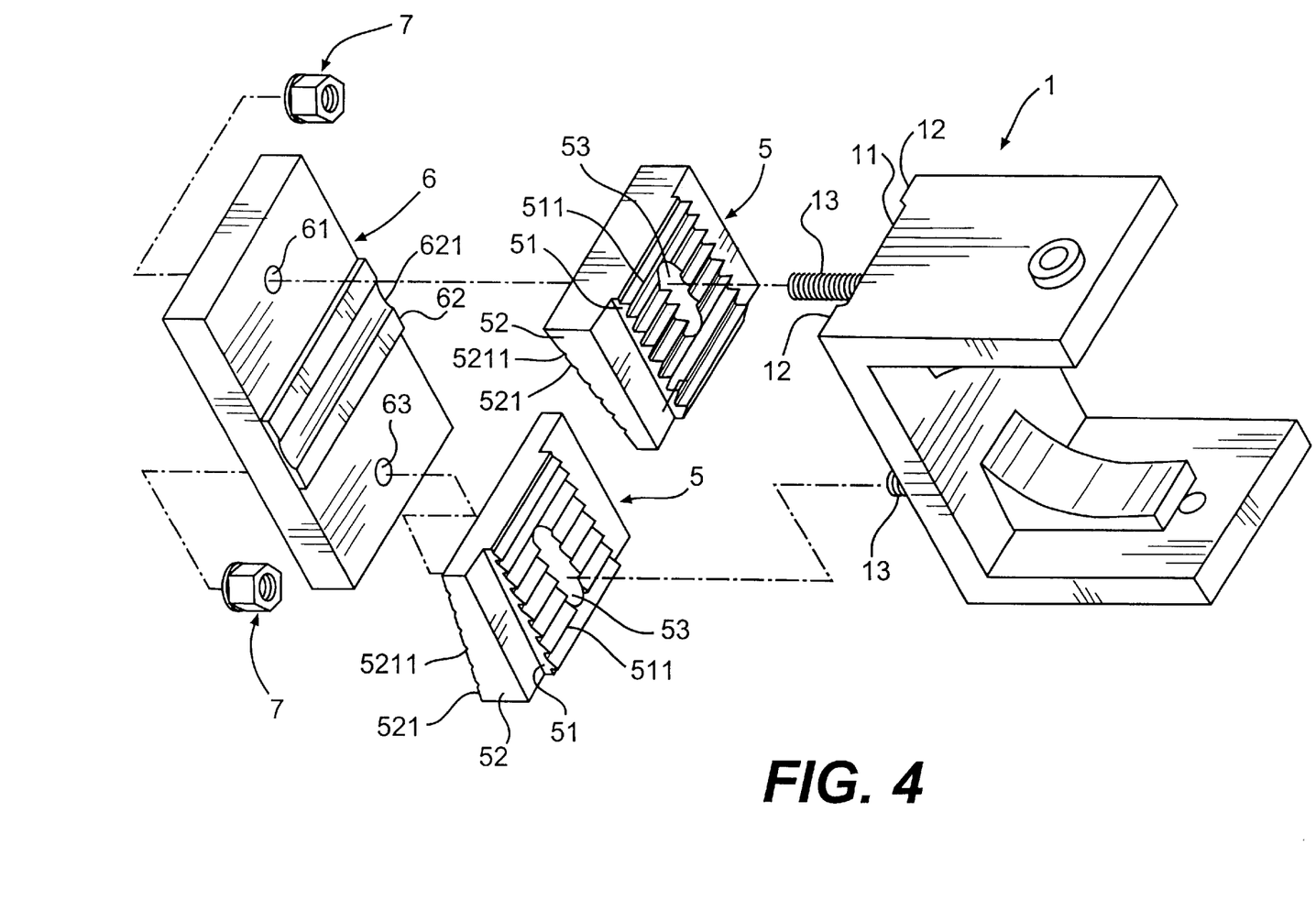
FIG. 4 is an exploded view of the present invention viewed from another angle.
Figure 5:
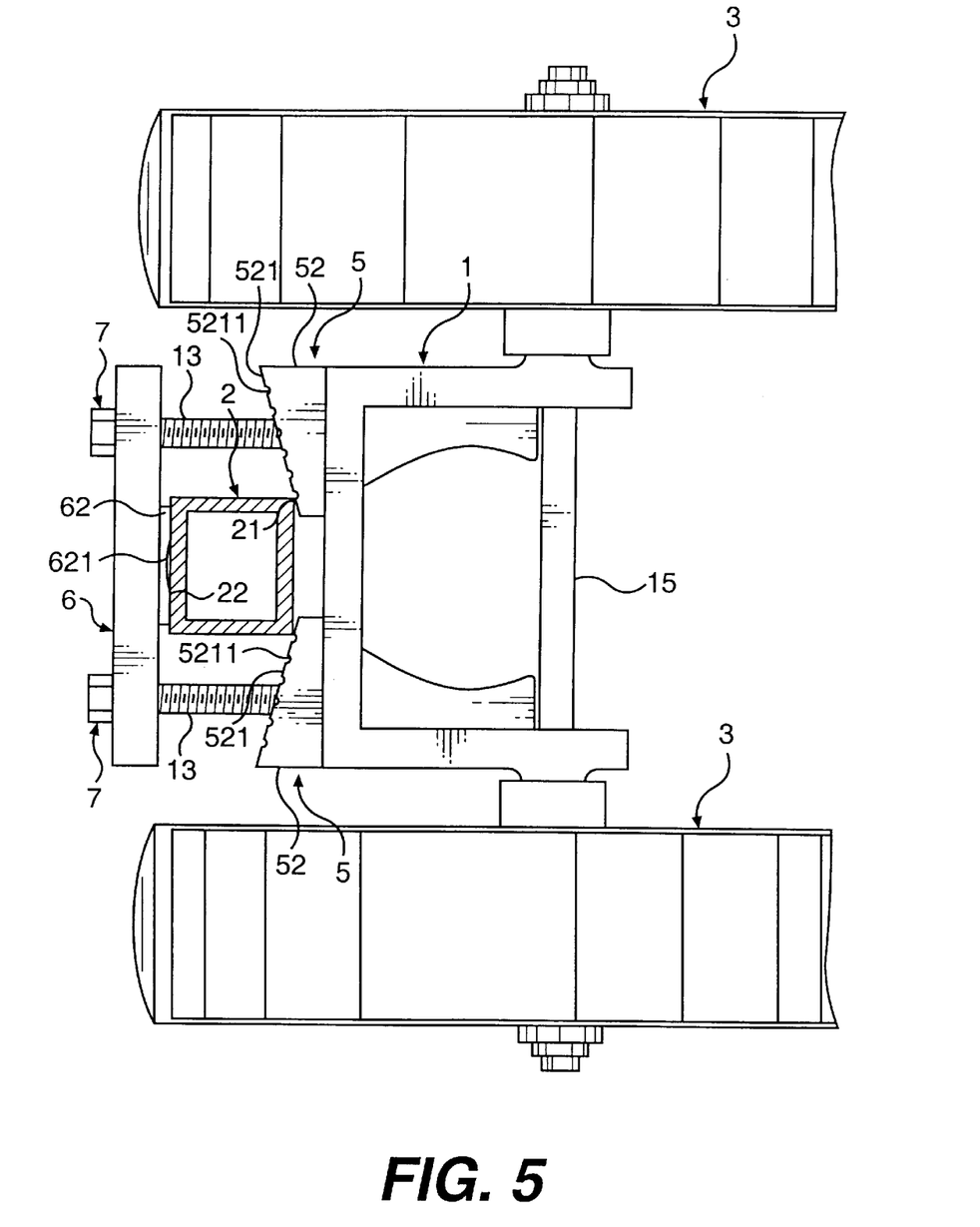
FIG. 5 illustrates the auxiliary wheel holder fastened to a rectangular main rod member according to the present invention.
Figure 6:
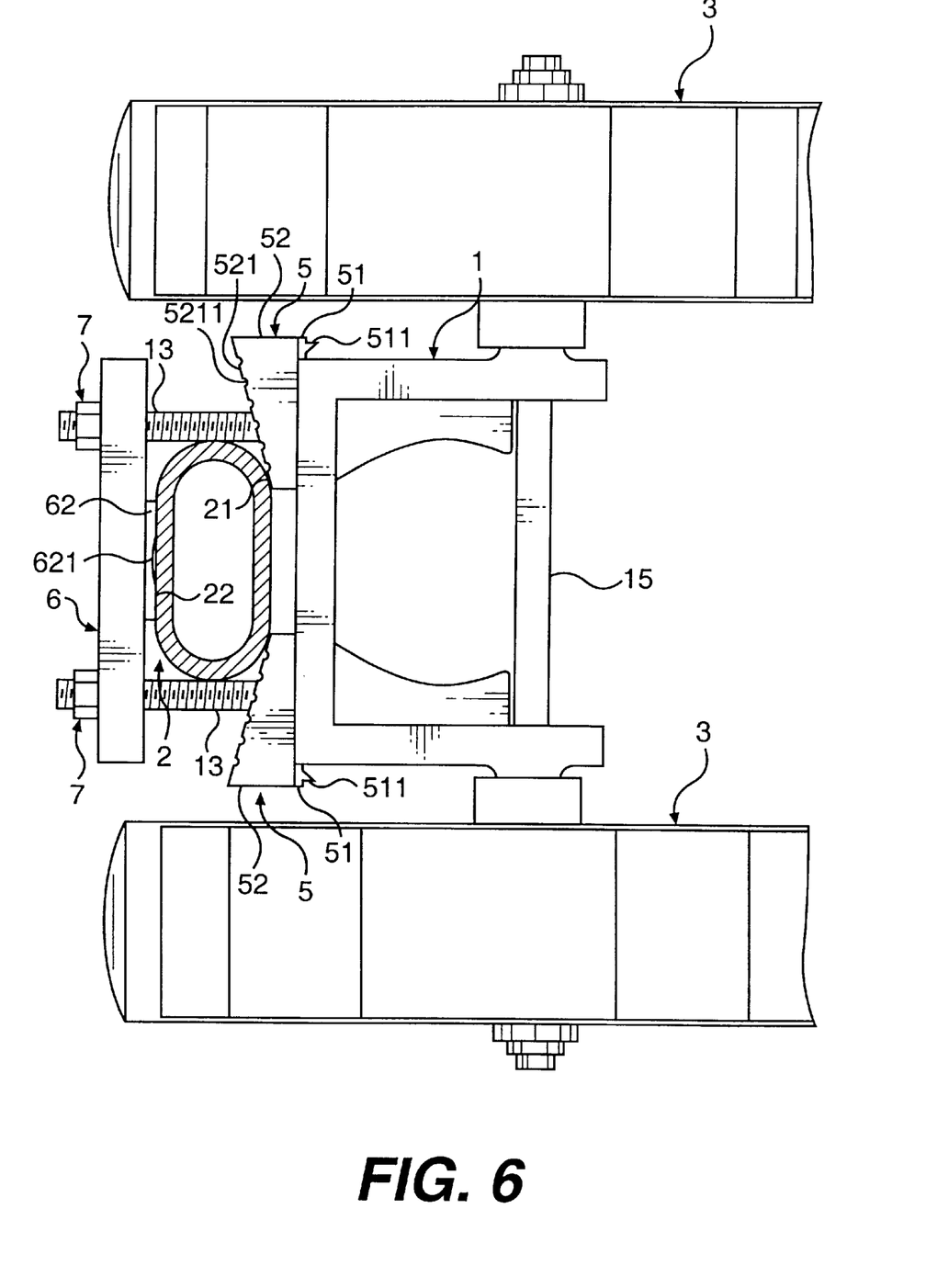
FIG. 6 illustrates the auxiliary wheel holder fastened to an oval main rod member according to the present invention.
Figure 7:
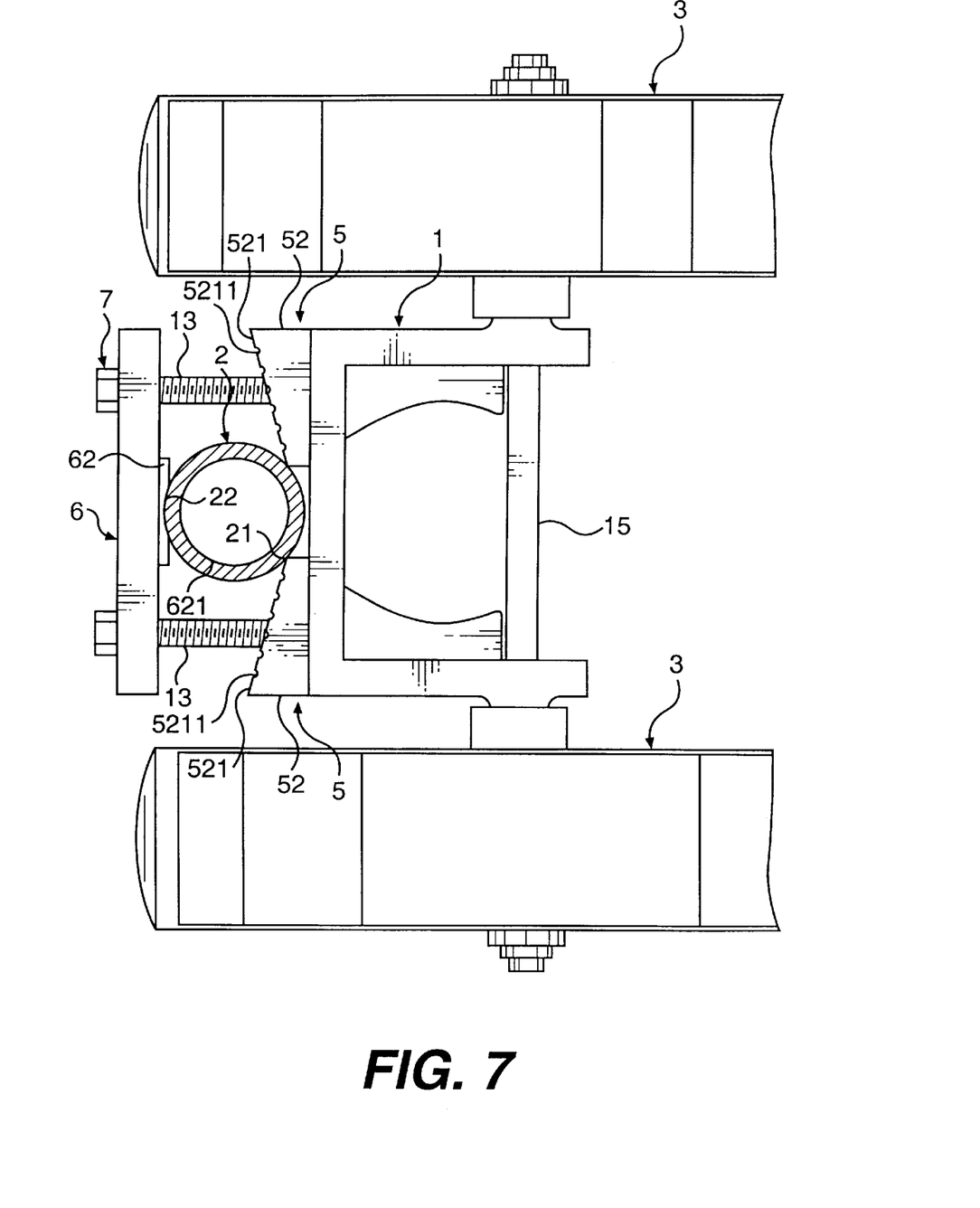
FIG. 7 illustrates the auxiliary wheel holder fastened to a round main rod member according to the present invention.
Figure 8:
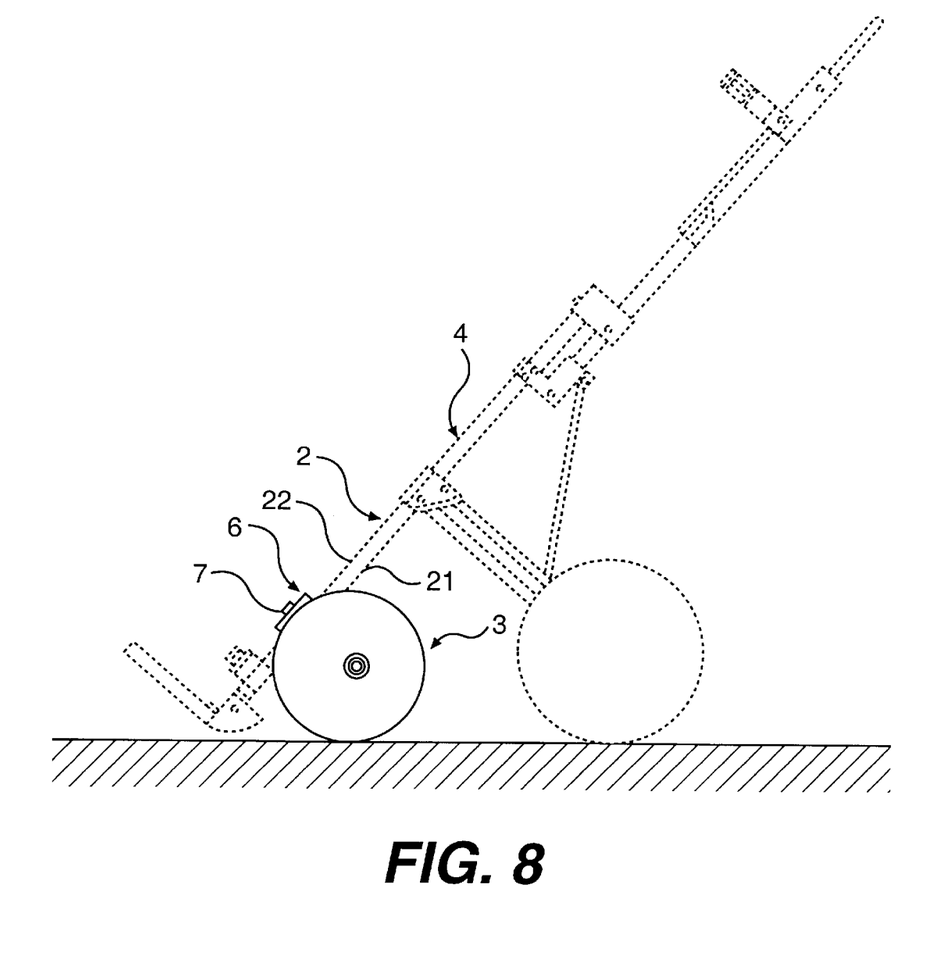
FIG. 8 illustrates the auxiliary wheel holder installed in the main rod member of a golf cart and the auxiliary wheel attached the ground according to the present invention.

Referring to FIG. 4 and FIGS. 2 and 3 again, the base frame 1 comprises an elongated top coupling groove 11 at the top side wall thereof, two elongated top flanges 12 respectively raised from the top side wall at two opposite sides of the elongated top coupling groove 11, two positioning means 111, 112 provided within the elongated top coupling groove 11 at two opposite sides between the elongated top flanges 12, the positioning means 111, 112 each comprised of a plurality of transverse teeth 1111, 1121 arranged in parallel between the elongated top flanges 12, and two upright screw rod 13 respectively raised from the positioning means 111, 112. Each packing block 5 comprises a block body 52 having a beveled top side wall 521, a plurality of anti-skid positioning grooves 5211 longitudinally arranged in parallel at the beveled top side wall 521 of the block body 52, a transverse coupling flange 51 raised from the flat bottom side wall of the block body 52 on the middle, a plurality of transverse teeth 511 integral with the transverse coupling flange 51 and arranged in parallel, and transversely extended elongated slot 53 pierced through the transverse coupling flange 51 and the block body 52 on the middle. The width of the transverse coupling flange 51 fits the top coupling groove 11 of the base frame 1. The transverse teeth 511 of the packing blocks 5 and the transverse teeth 1111, 1121 of the positioning means 111, 112 of the base frame 1 match well. The locating plate 6 comprises a flat, elongated positioning block 62 transversely raised from the bottom side wall thereof on the middle, the elongated positioning block 62 having a locating groove 621 extended on the middle to both ends thereof, and two countersunk holes 61 spaced from the positioning block 62 at two opposite sides at a pitch equal to the pitch between the upright screw rods 13 of the base frame 1. The locating groove 621 has a moothly arched cross section. When the upright screw rods 13 of the base frame 1 are respectively inserted through the elongated slots 53 of the packing blocks 5 and the countersunk holes 61 of the locating plate 6, two lock nuts 7 are respectively threaded onto the upright screw rods 13 and received in the countersunk holes 61 to fix the locating plate 6 to the base frame 1 (see FIG. 3).

Referring to Figures from 5 to 7 and FIG. 8 again, when in use, the elongated positioning block 62 of the locating plate 6 is closely attached to the periphery of the main rod member 2 at the top side 22 and fastened to the upright screw rods 13 of the base frame 1 by the lock nuts 7, the packing blocks 5 are respectively mounted on the upright screw rods 13 of the base frame 1 and firmly retained between the main rod member 2 and the base frame 1 with the transverse teeth 511 of the respective coupling flanges 51 meshed with the transverse teeth 1111, 1121 of the positioning means 111, 112 at the base frame 1, permitting the bottom side 21 of the main rod member 2 to be stopped against the anti-skid positioning grooves 5211 at the beveled top side walls 521 of the block bodies 52 of the packing blocks 5. In case the main rod member 2 is a round rod, the top side 22 of the periphery of the main rod member 2 is forced into engagement with the positioning groove 621 at the elongated positioning block 62 of the locating plate 6 (see FIG. 7).

I claim:

1. An auxiliary wheel holder fastened to the main rod member of a golf cart to hold a wheel axle and a pair of auxiliary wheels at two opposite ends of said wheel axle, enabling the golf cart to be moved on the ground when the golf cart is extended out, the auxiliary wheel holder comprising:

a base frame coupled to the main rod member of the golf cart at a bottom side, said base frame comprising an elongated top coupling groove at a top side wall thereof, two elongated top flanges respectively raised from the top side wall at two opposite sides of said elongated top coupling groove, two positioning means provided within said elongated top coupling groove at two opposite sides between said elongated top flanges, said positioning means each comprised of a plurality of transverse teeth arranged in parallel between said elongated top flanges, and two upright screw rods respectively raised from said positioning means;

two packing blocks respectively mounted on said upright screw rods and retained between said base frame and the periphery of the main rod member of the golf cart, said packing blocks each comprising a block body having a beveled top side wall stopped against the periphery of the main rod member of the golf cart, a transverse coupling flange raised from a flat bottom side wall of said block body on the middle and engaged into the top coupling groove of said base frame, a plurality of transverse teeth integral with said transverse coupling flange and meshed with the transverse teeth of the positioning means of said base frame, and a transversely extended elongated slot pierced through said transverse coupling flange and said block body on the middle for receiving the upright screw rods of said base frame;

a locating plate fastened to the upright screw rods of said base frame and attached to the main rod member of the golf cart at a top side to secure said base frame and said packing blocks to the main rod member of the golf cart, said locating plate comprising two countersunk holes, which receive the upright screw rods of said base frame respectively, and a flat, elongated positioning block transversely raised from a bottom side wall thereof on the middle and stopped against the periphery of the main rod member of the golf cart, the elongated positioning block of said locating plate having a locating groove extended on the middle to both ends thereof, the locating groove of the elongated positioning block of said locating plate having a smoothly arched cross section; and two lock nuts respectively threaded onto the upright screw rods of said base frame and mounted in the countersunk holes on said locating plate at a top side to secure said base frame to the main rod member of the golf cart.

2. The auxiliary wheel holder of claim 1 wherein said packing blocks each have a plurality of anti-skid positioning grooves longitudinally arranged in parallel at the beveled top said wall of the respective block body.

* * * * *